(12) United States Patent
Lackner et al.

(10) Patent No.: US 7,833,328 B2
(45) Date of Patent: Nov. 16, 2010

(54) LAMINAR SCRUBBER APPARATUS FOR CAPTURING CARBON DIOXIDE FROM AIR AND METHODS OF USE

(75) Inventors: Klaus S. Lackner, Dobbs Ferry, NY (US); Allen Wright, Tucson, AZ (US)

(73) Assignees: The Trustees of Columbia University in the City of New York, New York, NY (US); Kilimanjaro Energy, Inc., Waukesha, WI (US)

( * ) Notice: Subject to any disclaimer, the term of this patent is extended or adjusted under 35 U.S.C. 154(b) by 0 days.

(21) Appl. No.: 12/555,874

(22) Filed: Sep. 9, 2009

(65) Prior Publication Data

US 2009/0320688 A1   Dec. 31, 2009

Related U.S. Application Data

(63) Continuation of application No. 11/207,236, filed on Aug. 19, 2005, now abandoned.

(60) Provisional application No. 60/603,121, filed on Aug. 20, 2004.

(51) Int. Cl.
*B01D 53/14* (2006.01)
(52) U.S. Cl. ............... 96/281; 96/282; 95/236; 95/218; 423/210
(58) Field of Classification Search ........... 95/210–213, 95/236, 257, 218; 96/290, 296, 281–289; 261/114.5
See application file for complete search history.

(56) References Cited

U.S. PATENT DOCUMENTS

| | | | |
|---|---|---|---|
| 1,031,799 A | 7/1912 | MacKay | |
| 2,922,489 A * | 1/1960 | Lee | 96/251 |
| 3,063,195 A | 11/1962 | Ravich | 47/17 |
| 3,466,019 A * | 9/1969 | Priestley | 261/112.2 |
| 3,466,138 A | 9/1969 | Spiegler et al. | 23/2 |
| 3,489,506 A * | 1/1970 | Galstaun et al. | 423/233 |
| 3,498,026 A | 3/1970 | Messinger et al. | 55/73 |
| 3,627,478 A | 12/1971 | Tepper | 423/230 |
| 3,645,072 A | 2/1972 | Clapham | 55/387 |
| 3,712,025 A | 1/1973 | Wallace | 55/2 |
| 3,727,375 A | 4/1973 | Wallace | 55/2 |
| 3,833,710 A | 9/1974 | Deschamps et al. | 423/573 |
| 3,865,924 A | 2/1975 | Gidaspow et al. | 423/230 |
| 3,876,738 A | 4/1975 | Marinaccio et al. | 264/41 |
| 3,907,967 A * | 9/1975 | Filss | 423/210 |
| 3,948,627 A | 4/1976 | Schwarz et al. | 55/230 |
| 4,047,894 A | 9/1977 | Kuhl | 23/284 |
| 4,239,515 A | 12/1980 | Yanagioka et al. | 55/223 |
| 4,321,410 A * | 3/1982 | Ono et al. | 564/67 |
| 4,340,480 A | 7/1982 | Pall et al. | 210/490 |
| 4,497,641 A * | 2/1985 | Brown et al. | 95/225 |
| 4,528,248 A | 7/1985 | Galbraith et al. | 429/8 |
| 4,566,221 A | 1/1986 | Kossin | 47/41.12 |
| 4,711,645 A | 12/1987 | Kumar | 55/26 |
| 4,770,777 A | 9/1988 | Steadly et al. | 210/490 |
| 4,906,263 A | 3/1990 | Von Blucher et al. | 96/135 |
| 4,941,898 A * | 7/1990 | Kimura | 96/282 |
| 4,957,519 A * | 9/1990 | Chen | 96/326 |
| 4,980,098 A * | 12/1990 | Connery | 261/112.1 |
| 5,070,664 A | 12/1991 | Groh et al. | 52/177 |
| 5,215,662 A | 6/1993 | Johnson et al. | 210/500.38 |
| 5,277,915 A | 1/1994 | Provonchee et al. | 424/485 |
| 5,318,758 A | 6/1994 | Fujii et al. | 423/228 |
| 5,328,851 A * | 7/1994 | Zaromb | 436/178 |
| 5,385,610 A | 1/1995 | Deerer et al. | 118/241 |
| 5,414,957 A | 5/1995 | Kenney | 47/12.12 |
| 5,454,189 A | 10/1995 | Graham et al. | 47/41.12 |
| 5,535,989 A * | 7/1996 | Sen | 261/112.1 |
| 5,682,709 A | 11/1997 | Erickson | 47/58.1 R |
| 5,711,770 A | 1/1998 | Malina | 48/197 R |
| 5,756,207 A | 5/1998 | Clough et al. | 428/375 |
| 5,779,767 A | 7/1998 | Golden et al. | 95/96 |
| 5,797,979 A | 8/1998 | Quinn | 95/97 |
| 5,887,547 A | 3/1999 | Caveny et al. | 119/174 |
| 5,914,455 A | 6/1999 | Jain et al. | 95/96 |
| 5,917,136 A | 6/1999 | Gaffney et al. | 95/98 |
| 5,934,379 A | 8/1999 | Ostlyngen et al. | 169/46 |

(Continued)

FOREIGN PATENT DOCUMENTS

DE  4 130 837  4/1992

(Continued)

OTHER PUBLICATIONS

"Americans Believe in Global Warming . . . and Psychic Powers, Astrology, and UFO'S", S. Fred Singer, found at http://heartland.org/.

(Continued)

*Primary Examiner*—Duane Smith
*Assistant Examiner*—Ives Wu
(74) *Attorney, Agent, or Firm*—Hayes Soloway P.C.

(57) ABSTRACT

The present invention is directed to methods for carbon dioxide from air, which comprises exposing solvent covered surfaces to air streams where the airflow is kept laminar, or close to the laminar regime. The invention also provides for an apparatus, which is a laminar scrubber, comprising solvent covered surfaces situated such that they can be exposed to air streams such that the airflow is kept laminar.

7 Claims, 2 Drawing Sheets

U.S. PATENT DOCUMENTS

| | | | |
|---|---|---|---|
| 5,972,080 A | 10/1999 | Nagata | 96/13 |
| 5,980,611 A | 11/1999 | Kumar et al. | 95/101 |
| 6,004,381 A | 12/1999 | Rohrbach et al. | 95/211 |
| 6,117,404 A | 9/2000 | Mimura et al. | 423/228 |
| 6,136,075 A | 10/2000 | Bragg et al. | 96/135 |
| 6,180,012 B1 | 1/2001 | Rongved | 210/717 |
| 6,237,284 B1 | 5/2001 | Erickson | 47/58.1 R |
| 6,279,576 B1 | 8/2001 | Lambert | 128/205.28 |
| 6,316,668 B1 | 11/2001 | King et al. | 562/580 |
| 6,334,886 B1 | 1/2002 | Barnes, Jr. et al. | 95/181 |
| 6,503,957 B1 | 1/2003 | Bernatowicz et al. | 521/27 |
| 6,582,498 B1 * | 6/2003 | Sass et al. | 95/211 |
| 6,617,014 B1 | 9/2003 | Thomson | 428/304.4 |
| 6,716,888 B2 | 4/2004 | Bernatowicz et al. | 521/27 |
| 6,890,497 B2 | 5/2005 | Rau et al. | 423/220 |
| 7,132,090 B2 | 11/2006 | Dziedzic et al. | 423/230 |
| 7,343,341 B2 | 3/2008 | Sandor et al. | 705/37 |
| 7,384,621 B2 | 6/2008 | Stevens et al. | 423/650 |
| 7,415,418 B2 | 8/2008 | Zimmerman | 705/1 |
| 7,420,004 B2 | 9/2008 | Hardy et al. | 518/704 |
| 2001/0004895 A1 | 6/2001 | Preiss | 128/205.28 |
| 2001/0022952 A1 | 9/2001 | Rau et al. | 422/169 |
| 2002/0083833 A1 | 7/2002 | Nalette et al. | 95/139 |
| 2002/0178925 A1 * | 12/2002 | Mimura et al. | 96/299 |
| 2003/0145726 A1 | 8/2003 | Gueret et al. | 95/96 |
| 2003/0167692 A1 | 9/2003 | Jewell et al. | 48/197 |
| 2004/0031424 A1 | 2/2004 | Pope | 110/230 |
| 2004/0134353 A1 | 7/2004 | Gillingham et al. | 95/273 |
| 2004/0195115 A1 | 10/2004 | Colombo | 206/204 |
| 2004/0213705 A1 | 10/2004 | Blencoe et al. | 422/129 |
| 2004/0219090 A1 | 11/2004 | Dziedzic et al. | 423/437.1 |
| 2005/0011770 A1 | 1/2005 | Katsuyoshi et al. | 205/742 |
| 2005/0063956 A1 | 3/2005 | Bernklau et al. | 424/93.4 |
| 2005/0095486 A1 | 5/2005 | Hamamoto et al. | 429/231 |
| 2005/0204915 A1 | 9/2005 | Sammons et al. | 95/45 |
| 2005/0252215 A1 | 11/2005 | Beaumont | 60/753 |
| 2005/0269094 A1 | 12/2005 | Harris | 166/302 |
| 2006/0013963 A1 | 1/2006 | Thomson | 427/487 |
| 2006/0042209 A1 | 3/2006 | Dallas et al. | 55/524 |
| 2006/0051274 A1 | 3/2006 | Wright et al. | 423/220 |
| 2006/0186562 A1 | 8/2006 | Wright et al. | 261/94 |
| 2006/0249020 A1 | 11/2006 | Tonkovich et al. | 95/115 |
| 2007/0004023 A1 | 1/2007 | Trachtenberg | 435/266 |
| 2007/0187247 A1 | 8/2007 | Lackner et al. | 204/518 |
| 2007/0199448 A1 | 8/2007 | Yates et al. | 95/139 |
| 2007/0217982 A1 | 9/2007 | Wright et al. | 423/230 |
| 2008/0008793 A1 | 1/2008 | Forsyth et al. | 426/111 |
| 2008/0031801 A1 | 2/2008 | Lackner et al. | 423/438 |
| 2008/0087165 A1 | 4/2008 | Wright et al. | 95/51 |
| 2009/0120288 A1 | 5/2009 | Lackner et al. | 95/68 |
| 2009/0232861 A1 | 9/2009 | Wright et al. | 424/405 |
| 2009/0294366 A1 | 12/2009 | Wright et al. | 210/683 |

FOREIGN PATENT DOCUMENTS

| | | |
|---|---|---|
| DE | 19521678 | 6/1995 |
| DE | 195 21 678 | 12/1996 |
| DE | 20001385 | 1/2000 |
| DE | 200 01 385 | 8/2000 |
| EP | 0020055 | 5/1980 |
| EP | 0 020 055 | 12/1980 |
| EP | 0 254 137 | 1/1988 |
| FR | 2 029 424 | 10/1970 |
| GB | 1 031 799 | 6/1966 |
| GB | 1109439 | 4/1968 |
| GB | 1 204 781 | 9/1970 |
| GB | 1296889 | 11/1972 |
| JP | 58-122022 | 7/1983 |
| JP | 61 072 035 | 4/1986 |
| JP | 63012323 | 1/1988 |
| JP | 63012324 | 1/1988 |
| JP | 63-69525 | 3/1988 |
| JP | 2000-107895 | 4/2000 |
| RU | 1 828 406 | 7/1993 |
| WO | WO 98/16296 | 4/1998 |
| WO | WO 98/17388 | 4/1998 |
| WO | WO 00/50154 | 8/2000 |
| WO | WO 00/76633 | 12/2000 |
| WO | WO 01/21269 | 3/2001 |
| WO | WO 2005/108297 | 11/2005 |
| WO | WO 2006/009600 | 1/2006 |
| WO | WO 2006/036396 | 4/2006 |
| WO | WO 2006/084008 | 8/2006 |
| WO | WO 2007/016274 | 2/2007 |
| WO | WO 2009/149292 | 12/2009 |

OTHER PUBLICATIONS

"An Industrial Sized Unit" Drawing and specification.

"Capturing Carbon Dioxide From Air", Lackner et al., pp. 1-15.

"Carbon Dioxide Extraction from Air: Is It An Option?", Lackner et al., Proceedings of the $24^{th}$ Annual Technical Conference on Coal Utilization and Fuel Systems, Mar. 8-11, 1999, pp. 885-896.

"Carbon Dioxide Extraction From Air", Lackner et al., Arguments pp. 1-5.

"*Carbon Sequestration Could Be Employed Today To Help Alleviate Greenhouse Emissions*" found at http://www.earthinstitute. columbia.edu/news/2003/story06-25-03b.html.

"Chemical Extraction of Carbon Dioxide from Air to Sustain Fossil Energy by Avoiding Climate Change", Dubey et al., $2^{nd}$ Annual Conference on Carbon Sequestration, 2003.

"Climate Strategy with $CO_2$ Capture from the Air" Keith et al., Mar. 31, 2005, pp. 1-43.

"Climate Strategy with CO2 Capture From the Air", Keith et al., found at http://ideas.respec.org/p/hal/papers/halshs-00003926_v1. html.

"$CO_2$ Capture From The Air: Technology Assessment and Implications for Climate Policy", Keith et al., pp. 1-6.

"Compensation of Atmospheric $CO_2$ Buildup Through Engineered Chemical Sinkage", Elliot et al., pp. 1-8.

"Extraction of Carbon Dioxide from the Atmosphere Through Engineered Chemical Sinkage", Dubey et al., Fuel Chemistry Division Preprints, 2001, pp. 1-4.

"Extraction CO2 from the Air", Lackner presentation, 12 pgs.

"Imagine No Restriction on Fossil-Fuel Usage and No Global Warming!", Rickman, found at http://www.lanl.gov/news/releases/archive/02-028.shtml.

"In the Lab", Jason Hensel, found at www.eponline.com/articles/53584.

"Information About: David Keith" found at http://ideas.respec.org/e/pke74.html, http://www.ucalgary.ca/~keith/.

"New Findings May Redefine Renewable Energy Debate", Bituin, found at http://www.dailycal.org/article.php?id=8559.

"New Solutions to Oil Problems", Whitley Strieber's Unknown Country, 2002, found at http://www.unknowncountry.com/news/print.phtml?id=1467.

"*Researchers Explore Extracting CO2 Directly From Air*" found at http://www.earthvision.net/ColdFusion/News_Page1.cfm?NewsID=20309.

"Science for Sustainability: From Capturing Carbon Dioxide From Air to Environmental Impact of a Hydrogen Economy", Dubey, found at http://www.mbari.org/seminars/2003/spring2003/apr2_dubey.html.

"*The Carrot or the Slick: How to Build a Technology-Friendly Climate Policy in Canada*" Presentation by David Keith, Climate Change Central Apr. 15, 2005, pp. 1-32.

"The Case for Carbon Dioxide Extraction From Air," ($CO_2$ Extraction From Air, A White Paper from Los Alamos National Labs) Lackner et al., Sourcebook, Sep. 1999, vol. 57, No. 9, pp. 6-10.

"*Written Public Comments on the Strategic Plan for the U.S. Climate Change Science Program, General Comments*", 2003, pp. 1-160.

Abstracts of Eos. Trans. AGU, 82 (47).

Abstracts of Eos. Trans. AGU, 83 (19), Spring Meeting 2002, 3 pgs.

Abstracts of Eos. Trans. AGU, 83 (47), Fall Meeting 2002, 3 pgs.

*Environment & Client News*, vol. 5, No. 7, Aug. 2002, 20 pgs.
Information on David Keith found at http://www.ucalgary.ca/~keith/.
International Application No. PCT/US2006/003646 Date of Mailing: Jan. 24, 2008.
International Preliminary Report on Patentability, Dated Jan. 24, 2008.
International Report on Patentability, PCT/US2007/084880.
J. Balster et al., "Multi-Layer Spacer Geometries With Improved Mass Transport", May 16, 2006, pp. 351-361.
Lackner et al., "Free-Market Approaches to Controlling Carbon Dioxide Emissions to the Atmosphere: A Discussion of the scientific basis", Los Alamos National Laboratory (Lackner & Ziock) & Harvard University (Wilson), pp. 1-16.
Lackner, Klaus S., "Can Fossil Carbon Fuel the 21$^{st}$ Century?", International Geology Review, vol. 44, 2002, pp. 1122-1133.
Notification Concerning Transmittal of International Preliminary Report on Patentability (Chaper 1 of the Patent Cooperation Treaty) International Application No. PCT/US2006/003646 Date of Mailing: Jan. 24, 2008.
Office Action for U.S. Appl. No. 11/209,962, dated Sep. 11, 2009, (16 pgs).
Russian Official Action + Translation, dated Feb. 11, 2010, Appln. No. 2007132880/15 (05886), (13 pgs).
T.Sata, "Monovalent Cation Permselective Exchange Membrane", Apr. 15, 1972, pp. 980-982.
Toshikatsu Sata, "Modification of Properties of Ion Exchange Membranes. IV. Change of Transport Properties of Cation-Exchange Membranes by Various Polyelectrolytes", 1978, pp. 1063-1080.

Toshikatsu, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.
Toshikatsu, Yukio Mizutani, "Modification of Properties of Ion Exchange Membranes. VII. Relative Transport No. between Various Cations of Cation Exchange Membrane Having Cationic Polyelectrolyte Layer and Mechanism of Selective Permeation of Particular Cations", 1979, pp. 2071-2085.
Sun et al., "$CO_2$ sorption in activated carbon in the presence of water", dated Feb. 9, 2007, Science Direct, Chemical Physics Letterse 437 (2000) 14-16, (3 pgs).
Liang, "Carbon Dioxide Capture From Flue Gas Using Regenerable Sodium-Based Sorbents", dated Aug. 1, 2003, Department of Chemical Engineering Thesis, (137 pgs).
International Search Report and Written Opinion, dated Feb. 19, 2009, (17 pgs).
Dow Chemical Company, Dowex Type I Strong Base Anion Resin, 1998, http://www.inaqua.de/Prod/ion/pdf_en/313_UPCORE_Mono_A625.pdf, p. 1.
International Search Report and Written Opinion mailed Jan. 27, 2009.
Official Action dated Mar. 15, 2010, U.S. Appl. No. 11/683,824, 10 pgs.

* cited by examiner

LAMINAR SCRUBBER APPARATUS FOR CAPTURING CARBON DIOXIDE FROM AIR AND METHODS OF USE

CROSS REFERENCE TO PRIOR APPLICATION

This application claims the benefit of U.S. Provisional Application No. 60/603,121, filed Aug. 20, 2004, and U.S. Nonprovisional application Ser. No. 11/207,236, filed Aug. 19, 2005, now abandoned, both of which are incorporated by reference as if disclosed herein in their entirety.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The present invention relates generally to the field of extractors, including those that work to extract carbon dioxide. The present invention relates to carbon dioxide ($CO_2$) removal under ambient conditions from the open air without heating or cooling the air.

BACKGROUND OF THE INVENTION

Extracting carbon dioxide from ambient air would make it possible to use carbon based fuels and deal with the greenhouse gas emissions after the fact. Since $CO_2$ is neither poisonous nor harmful in parts per million quantities but creates environmental problems simply by accumulating in the atmosphere, it is possible to remove carbon dioxide from air in order to compensate for an equally sized emission elsewhere and at different times. The overall scheme of air capture has been described elsewhere.

The production of carbon dioxide ($CO_2$) occurs in a variety of industrial applications, such as the generation of electricity by burning coal in power plants. Flue gas from coal-burning power plants typically contains a high percentage of nitrogen, about 13% $CO_2$, about 3% oxygen, about 10% water and less than 1% of various pollutants. To sequester $CO_2$ during the operation of coal burners in power plants, $CO_2$ must be separated from the flue gas, which is hot, e.g., temperatures from about 200° C. to about 1000° C. depending on its specific locations in the flue gas lines of the coal-burning power plant. In a carbon constrained world, central sources of $CO_2$ like power plants are likely to capture their own $CO_2$ from the power plant stack.

Hydrocarbons are typically the main components of fuels that are combusted in combustion devices, such as engines. Exhaust gas discharged from such combustion devices contains carbon dioxide gas, which at present is simply released to the atmosphere. However, as greenhouse gas concerns mount, carbon dioxide emissions from all sources will have to be curtailed.

Scrubber designs for separating $CO_2$ from air already exist, but they are limited to packed bed type implementations whose goal is typically to remove all traces of an impurity from another gas. The disadvantages in the art are addressed and overcome by the carbon dioxide separation membranes and methods of use thereof as embraced by the present invention.

SUMMARY OF THE INVENTION

The present invention is directed to methods for removing carbon dioxide from air, which comprises exposing solvent covered surfaces to air streams where the airflow is kept laminar, or close to the laminar regime. The invention also provides for an apparatus which is a laminar scrubber, comprising solvent covered surfaces situated such that they can be exposed to air streams such that the airflow is kept laminar. The following descriptions of the invention include many embodiments and aspects, all of which can be attributable to either the method or the apparatus claimed, even if not so explicitly stated.

Capture of carbon dioxide on board of a vehicle while possible in principle is not practical because of the large amount of weight involved. Therefore our invention aims at capturing carbon dioxide from the air at a later time. The purpose of the removal of carbon dioxide from the air is to balance out the carbon dioxide emission resulting from the operation of vehicle. While the most obvious sources of carbon dioxide emissions that could be remedied by this invention are those for which it would be difficult or impossible to capture the $CO_2$ at the point of emission, the invention is not restricted to such sources but could compensate for any source as well. Indeed this approach of carbon dioxide mitigation could be used to lower the atmospheric concentration of $CO_2$.

Efficient capture of carbon dioxide from air requires a sorbent that can absorb $CO_2$ with minimum energy costs. Processes that heat or cool the air, or that change the pressure of the air by substantial amounts will be energetically disadvantaged.

The apparatus consists of a scrubber design which provides essentially straight flow paths for the air that is blowing through the device. Sorbent covered surfaces are within millimeters to centimeters of the flow path of every air parcel. The simplest embodiment is a set of flat plates with the air moving through the gaps between the plates and the sorbent flowing over the surfaces. In the simplest design these plates stand upright so that wetting of both surfaces can be performed with equal ease. However a variety of other designs described below can vary from this simple design. These include but are not limited to corrugated surfaces, concentric tubes etc.

In one aspect of the invention, the surfaces are smooth parallel plates. In another aspect, the surfaces are not entirely flat, but follow straight parallel lines in the direction of the airflow. Examples include but are not limited to corrugations, pipes or tubes, angular shapes akin to harmonica covers. The invention provides for methods where the surfaces are roughened with grooves, dimples, bumps or other small structures that are smaller than the surface spacing and that remain well within the laminar boundary of the air flow, i.e., the Reynolds number of the flow around these dimples is small, in an optimum it is between 0 and 100.

The present invention is directed to implementations of the above method where surface roughening has been obtained through sand blasting or other similar means. In one aspect of the invention, the surface roughening can be obtained by etching.

In another aspect of the invention, the apparatus contains surfaces that are part of plates made from steel or other hydroxide resistant metals. In one aspect of the invention, the plates are made from glass. In another aspect, the plates are made from plastics, including but not limited to polypropylene.

In yet another aspect of the invention, the surfaces are foils or other thin films that are held taut by wires and supported by taut wire or wire netting. The invention provides for an apparatus where all but a supporting wire in the front and the back run parallel to the wind flow direction. In one aspect, the films are supported on a rigid structure. For example, the rigid structure can be a solid plate, a honeycomb, or latticework that can lend structural rigidity to the films. The invention is not limited to these examples.

The invention also provides for an apparatus and method where the films are made from plastic foils. The invention provides for an apparatus and method where the plastic foil has been surface treated to increase the hydrophilicity of the surface. Such treatments can be state of the art or represent novel treatments. In another aspect of the invention, an apparatus or method is provided where surfaces have been coated or treated to increase hydrophilicity of the plates.

The method or apparatus of the invention further provides that the direction of the airflow is horizontal. The method or apparatus of the invention provides that the surfaces—or the line of symmetry of the surfaces—is vertical. The invention provides for where the liquid solvent flow is at right angle to the airflow. The invention provides for a method and an apparatus where the surface spacing is between 0.3 centimeters (cm) and 3 cm. In another embodiment, the surface length at right angle to the airflow direction is between 0.30 m to 10 m. In another embodiment, the airflow speed is between 0.1 meters per second (m/s) and 10 m/s. In another embodiment, the distance of airflow between the surfaces is between 0.10 m and 2 m.

In one embodiment of the invention, liquid solvent is applied by means of spraying a flow onto the upper edge of the surface. In another embodiment, the solvent is applied to both sides of the plates. In another embodiment, the solvent is applied in a pulsed manner. In another embodiment, the liquid solvent is collected at the bottom of the surfaces or plates in a catch tray.

In another embodiment of the method and apparatus, the collected fluid or $CO_2$ solvent is immediately passed on to a recovery unit. In another embodiment, the collected fluid is recycled to the top of the scrubbing unit for additional $CO_2$ collection.

In another embodiment of the method or apparatus of the invention, the apparatus is equipped with airflow straighteners to minimize losses from misalignment between the surfaces and the instantaneous wind field.

In another embodiment of the method or apparatus of the invention, the apparatus is equipped with mechanisms that either passively or actively steer the surfaces so that they point into the wind.

In another embodiment of the method or apparatus of the invention, the laminar wind scrubber utilizes pressure drops created by natural airflows. In one embodiment, the pressure drops created by natural airflows include, but are not limited to: (a) wind stagnation in front of scrubber; (b) pressure drops created by flows parallel to the entrance and/or exit into the scrubbers; (c) pressure drops created by thermal convection as for example in a cooling tower or by thermal convection along a hill side.

In one embodiment of the method or apparatus, the surfaces are rotating disks where wetting is helped by the rotary motion of the disks, and the air is moving at right angle to the axis. In another embodiment of the method or apparatus, the axis is approximately horizontal and the disks dip into the solvent at their rim and the circular motion promotes distribution of the fluid on the disks.

In another embodiment, the liquid is sprayed onto the disk as it is moved by a radially aligned injector. In another embodiment, the liquid is extruded onto the disk near the axis.

In another embodiment of the invention, the surfaces are concentric tubes of circular or other cross-section shape with the air flowing in the direction of the tube axis. In another embodiment, the tubes rotate around the center axis. In one embodiment of the invention, the tube axis is oriented approximately vertically and solvent is applied in a manner that it flows downward on the surfaces of the tube. In another embodiment, the axis is at some angle to the vertical and the solvent is inserted at a single point at the upper opening and flows downward in a spiral motion covering the entire surface.

In one embodiment of the invention, the solvent used in the apparatus and in the method is a hydroxide solution. In one aspect, the hydroxide concentration is from about 0.1 molar to about 20 molar. In another embodiment, the hydroxide concentration is from about 1 molar to about 3 molar. In one embodiment, the concentration of the solution exceeds 3 molar. In another aspect of the invention, the concentration of the solution has been adjusted to minimize water losses or water gains. In another embodiment of the invention, the concentration of the solution is allowed to adjust itself until its vapor pressure matches that of the ambient air.

In one embodiment, the hydroxide is sodium hydroxide. In another embodiment, the hydroxide is potassium hydroxide. In another embodiment, the solvent is a hydroxide solution where additives or surfactants have been added. In a further embodiment, the additives or surfactants work to increase the reaction kinetics of $CO_2$ with the solution. Without limitation, such additives could be state of the art or improvements on the art. In one embodiment, the additives are intended to reduce the water vapor pressure over the solution. Such additives could be state of the art or improvements on the art. In a further embodiment of the invention, the additives or surfactants change the viscosity or other rheological properties of the solvent. In one aspect of the invention, the additives or surfactants improve the absorption properties of the solvent to scrub gases other than $CO_2$ from the air (e.g. ozone). In another embodiment, the method or apparatus combines additives that create all or part of the properties disclosed hereinabove.

BRIEF DESCRIPTION OF THE DRAWINGS

Additional aspects, features and advantages afforded by the present invention will be apparent from the detailed description and exemplification hereinbelow, taken in conjunction with the accompanying drawings wherein like numerals depict like parts, and wherein.

DETAILED DESCRIPTION OF THE INVENTION

Figure 1:
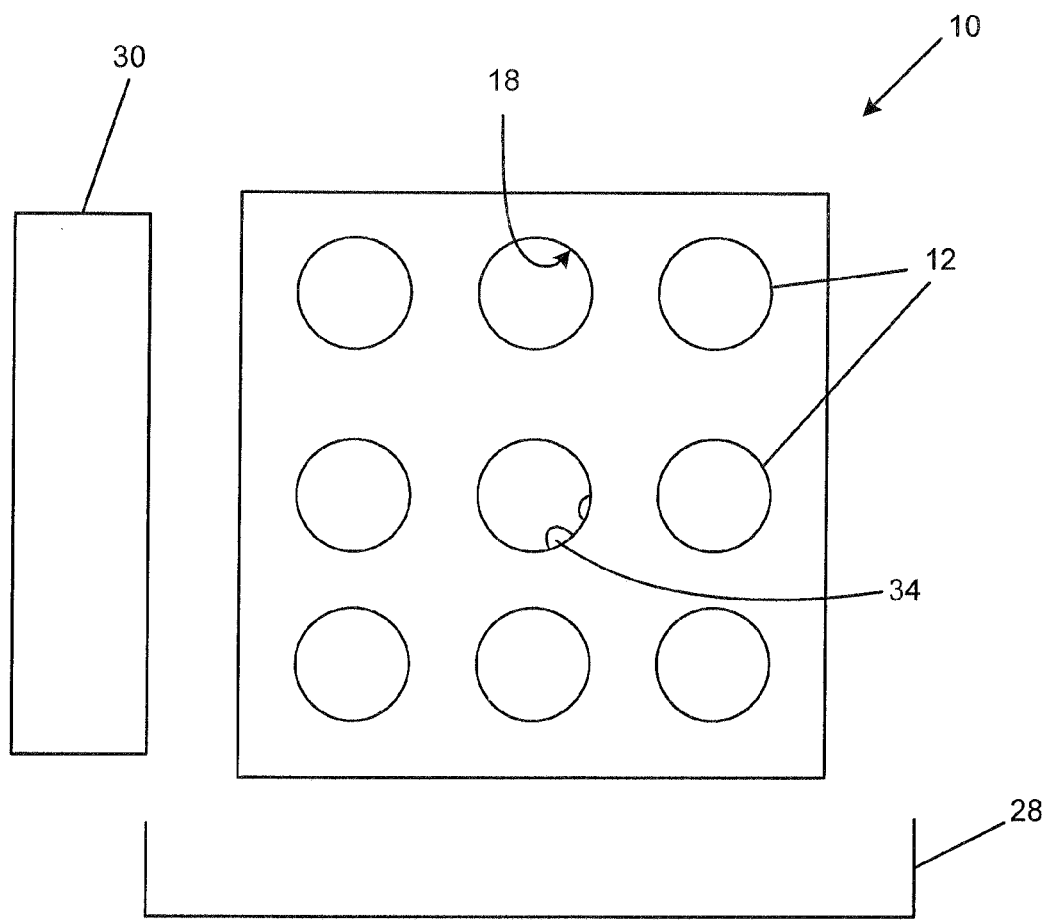
FIG. 1 is an end view.

The present invention is directed to methods and devices to capture carbon dioxide by absorption into a strongly alkaline solution. Although general for sorbent recovery already exist, the present invention includes an apparatus designed to expose alkaline fluids to atmospheric air where these fluids absorb $CO_2$.

An apparatus that performs this task is the first in a series of modules that together provide air capture capabilities. The system discussed here differs from previous $CO_2$ scrubber designs in that it is optimized for capturing carbon dioxide from air rather than scrubbing air clean of $CO_2$. As a result uniform extraction from the air or maximum reduction of the $CO_2$ content of the air are not at issue, what matters is maximizing the rate of $CO_2$ uptake by the sorbent fluid.

Such technology would provide the ability of delivering gasoline, diesel or other carbonaceous fuels that are effectively carbon neutral because already prior to their combustion an amount of $CO_2$ has been removed from the air that matches their ultimate emission. Similarly it is possible to compensate for the emissions of a car or any other vehicle including airplanes by removing the amount of $CO_2$ that will be emitted over the lifetime of the vehicle before or shortly after their introduction to the market.

One Embodiment

Description of an Air Scrubber Unit

The purpose of an air scrubber unit is to remove $CO_2$ from an airflow that is maintained by a low-pressure gradient. Air scrubber units could also capture other gases present in the air. Typical pressure gradients are such that they could be generated by natural airflows. Pressure drops across the unit range from nearly zero pressure to a few hundreds of Pascal, a preferred range is from 1 to 30 Pa and an optimal range may be from 3 to 20 Pa. However, we explicitly state that we do not limit our claim to units that are exclusively wind driven. We also consider the use of fans either with or without ductwork to guide the air and we explicitly consider units that are driven by convection.

Flow velocities through the scrubber unit may range from virtually stagnant to a few tens of meters per second. A preferred range would be from 0.5 to 15 m/s an optimal range for wind driven systems ranges from 1 m/sec to 6 m/sec.

The apparatus of the invention in one embodiment comprises a flat, hydroxide coated, surfaces approximately centimeters apart. These large flat sheets are referred to as lamellae. In one embodiment, a single lamella is bound by two sheets covered in hydroxide solution. Air flows between the sheets and parallel to their surfaces. A set of lamellae form a complete and independent unit, which is referred to herein as a scrubber cell. The typical depths of these surfaces or lamellae range from tens of centimeters to a few meters and the height can vary from tens of centimeter to many meters.

The surfaces could be made from solid plates, light-weight mesh like structures covered with thin membranes or films, or from thin films that are held in place with wire mesh structure.

There is quite some flexibility in the overall design, but the following are important design features that distinguish this approach from others:

1) Plate structures are smooth in the direction of the airflow on scales of the plate separation. (However, incidental or engineered structures on a much finer scale may be used to improve the $CO_2$ transport coefficient.) Variations in shape that are at right angles to the air flow are of relatively little concern, as long as they do not interfere with the efficient wetting of the plates, sheets or surfaces.

2) The surfaces are held in place sufficiently tightly or rigidly for their flexing or flapping not significantly to reduce pressure variations between the lamellae.

3) Flow through openings in the surfaces is inhibited so that it cannot significantly reduce pressure variations between the lamellae.

4) The spacing between the lamellae is chosen such that the system does not transition out of the laminar flow or at least does not deviate much from that regime.

5) The depth of the membrane units is kept short enough to avoid nearly complete depletion of the air in the front part of the unit.

6) For utilization of both sides of the plates it is preferable to arrange the surfaces vertically. However, deviations from such a design could be considered for other flow optimizations.

7) The height of the lamella is chosen to optimize wetting properties of the surfaces and to minimize the need for reprocessing the fluid multiple times.

Applying liquid solvent to the surfaces could follow established state of the art approaches, e.g. spray nozzles, liquid extrusion. It also could be optimized using less conventional approaches. One aspect of this invention is directed to one specific approach where the apparatus includes a laminar flow design that exposes solvent covered surfaces to air streams.

The apparatus of this invention can be designed in various ways so long as it is able to perform the functions described herein. For example, designs could wet vertical surfaces near the top and let gravity run the fluid over the surface until the entire area is covered. Alternatively, the surfaces could be shaped as flat disks which are wetted as they rotate. The motion would distribute the liquid along these surfaces.

Examples of designs that are meant as illustration rather than an exhaustive description include 1) flat rectangular surfaces or plates aligned parallel to each other 2) Corrugated surfaces that are lined up parallel to each other 3) Flat disks rotating around a center axis with the air flowing at right angle to the axis of rotation. Liquid could be applied by the wheels dipping into fluid near the bottom of the motion. The standing liquid may only cover the outer rim of the disks or reach all the way to the axle. Alternatively liquid may be injected onto the rim by liquid wetting near the axle and flowing around the disk due to gravity and rotary motion.

4) Concentric tubes or similar shapes where air would be blowing along the tube axis.

5) Such tubes could be arranged vertically for counterflow designs with wetting initiated at the upper rim or, 6) nearly horizontally with liquid entering at one end and one point and getting distributed through a slow rotating motion of the tubes.

Figure 2:
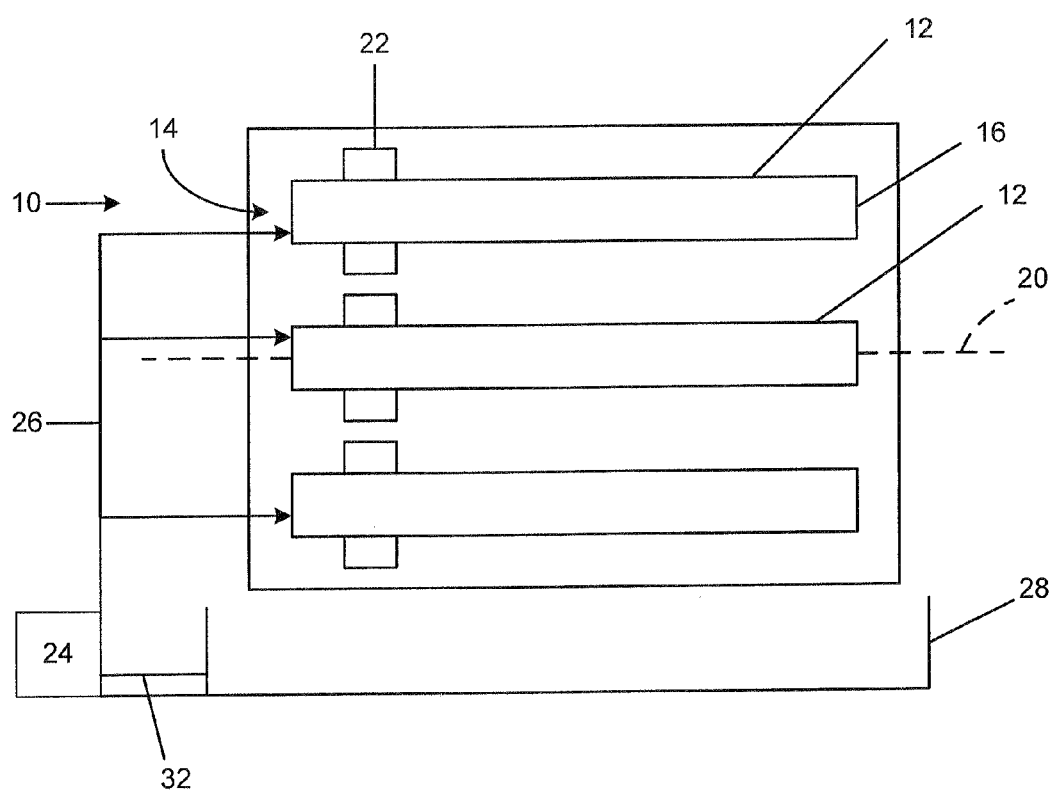
FIG. 2 is a side elevational view of a scrubber apparatus in accordance with the present invention.

Referring now to FIGS. 1 and 2, there is illustrated a scrubber apparatus 10 comprising a plurality of substantially horizontal concentric tubes 12 each including first and second ends 14, 16. Ends 14, 16 are open so as to allow a flow of open air to pass through the tubes and directly contact the tube inner surfaces 18. The tubes are mounted for rotation around their center axis 20, driven by a drive mechanism 22. A $CO_2$ solvent is applied to the surfaces 18 of the tubes, pumped from a supply by a pump 24 though a conduit 26. By arranging the tubes 12 nearly horizontal, a liquid may be introduced through one open end, at one point, and distributed over the inner surfaces 18 of the tube through a slow rotating movement of the tube, and finally drained out of the other end of the tube into catch tray 28.

If desired, air flow guides 30 may be provided to direct the air flow substantially horizontally through the tubes, and preferably for directing the air flow substantially parallel to the long axis of the tubes 18.

Also, if desired, a fluid collected in catch tray 28 may be recycled via conduit 32 to pump 24 and conduit 26.

If desired, surface 18 of tubes 12 may be provided with one or more grooves, dimples, bumps or other surface structures 34 so that air flowing through the tube is remained within the laminar boundary of air flow.

Solvents that absorb $CO_2$ span a wide variety of options. Here we focus on aqueous hydroxide solutions. These would tend to be strong hydroxide solutions above 0.1 molar and up to the maximum possible level (around 20 molar).

Solvents must wet the surfaces of the scrubber. To this end we consider various means known in the art. These include surface treatments that increase hydrophilicity, surfactants in the solvent and other means.

Hydroxides could be of a variety of cations. Sodium hydroxide and potassium hydroxides are the most obvious, but others including organic sorbents like MEA, DBA etc. are viable possibilities.

Hydroxides need not be pure, they could contain admixtures of other materials that are added to change or modify various properties of the solvent. For example, additives may improve on the reaction kinetics of the hydroxide with the $CO_2$ from the air. Such catalysts could be surfactants or molecules dissolved in the liquid. Additions of organic compounds like MEA are just one example. Other additives may help in reducing water losses by making the solution more hygroscopic. Yet other additives may be used to improve the flow or wettability characteristic of the fluid or help protect the surfaces from the corrosive effects of the hydroxide solution.

Wind Collection with Hydroxide Solvents

The rate of uptake of $CO_2$ into a strong hydroxide solution has been well studied [REFS] and we are using the result of these studies to design a device that will pull $CO_2$ directly out of a natural wind flow or out of a flow subject to a similar driving force, e.g. a thermally induced convection.

$CO_2$ uptake into a strong hydroxide solution involves a chemical reaction that greatly accelerates the dissolution process. The net reaction is $$CO_2(\text{dissolved}) + 2OH^- \rightarrow CO_3^{--} + H_2O \quad (1)$$

There are several distinct pathways by which this reaction can occur. The two steps that are relevant at high pH are $$CO_2(\text{dissolved}) + OH^- \rightarrow HCO_3^- \quad (2)$$

followed by $$HCO_3^- + OH^- \rightarrow CO_3^{--} + H_2O \quad (3)$$

The latter reaction is known to be very fast, the first reaction on the other hand proceeds at a relatively slow rate. The reaction kinetics for reaction (2) is described by $$\frac{d}{dt}[CO_2] = K[OH^-][CO_2]$$

Hence the time constant describing the reaction kinetics is $$\tau = \frac{1}{K[OH^-]}$$

The rate constant K has been measured. At 20° C. and infinite dilution, $\kappa = 5000$ liter $mol^{-1}s^{-1} = 5$ $m^3 mol^{-1} s^{-1}$ The ionic strength correction is given by $\kappa = \kappa_\infty 10^{0.134}$ At high concentration of $CO_2$ in the gas, the rate of reaction (2) limits the rate of uptake, even though the time constant for a one molar solution at 0.14 ms is quite short.

Following standard chemical, engineering models, e.g. Dankwert or Astarita, one can describe the transfer process in which a gas component is dissolved or chemically absorbed into a solvent with a standard model that combines a gas-side flow transfer coefficient and a liquid side transfer coefficient to describe the net flow through the interface, The total flux is given by $$F = \kappa_G(\rho(\chi=-\infty) - \rho(\chi=0)) = \kappa_L(\rho'(\chi=0) - \rho'(\chi=\infty))$$

where $\rho$ and $\rho'$ are the molar concentrations of $CO_2$ in the gas and in the solution respectively. The parameter x characterizes the distance from the interface. Distances into the gas are counted negative. At the boundary Henry's law applies hence $$\sigma(0) = K_H \rho(0)$$

Expressed as a dimensionless factor, $K_H = 0.7^1$.

For the gas side the transfer constant can be estimated as $$K_G = \frac{D_G}{\Lambda}$$

where $\Lambda$ is the thickness of the laminar sublayer that forms on the surface of the interface. The thickness of this layer will depend on the geometry of the flow and on the turbulence in the gas flow. For purposes of this discussion we consider it as given. Our goal is to determine the optimal choice for $\Lambda$.

For a fluid package, the standard approach to estimating the transfer coefficient assumes a residence time $\tau_D$ for the parcel on the surface of the fluid. This time results from the flow characteristic of the solvent and it includes surface creation and surface destruction as well as turbulent liquid mixing near the surface.

Since diffusion in the time $\tau_D$ can mix the dissolved $CO_2$ into a layer of thickness $\lambda\sqrt{D\tau_D}$, the flux from the surface is given by $$F = D_L \frac{\partial \rho'}{\partial \chi}$$

Approximating the gradient by $$\frac{\partial \rho}{\partial \chi} = \frac{\rho'(0) - \rho'(\infty)}{\lambda}$$

Shows that for a diffusion driven absorption process

[1] Note that typically, Henry's constant has dimensions, as concentrations on the gas side are measured as partial pressure, i.e., in units of Pascal or units of atmospheres (atm), whereas the liquid side concentrations are typically measured as moles per liter. Thus a typical unit would be liter/mol/atm.

$$K_L = \frac{D_L}{\lambda} = \sqrt{\frac{D_L}{\tau_D}}$$

Here $D_L$ is the diffusion rate of $CO_2$ in the solvent.

In the presence of a fast chemical reaction where the reaction time $\tau_R \ll \tau_D$, the layer that absorbs $CO_2$ is characterized by this shorter time, hence the transfer coefficient is given by $$K_L = \sqrt{\frac{D_L}{\tau_R}}$$

In the presence of a chemical the transfer coefficient is increased therefore by a factor $$\sqrt{\frac{\tau_D}{\tau_R}}$$

However, this enhancement can only be maintained if the supply of reactant in the solvent is not limited. In the case of carbon dioxide neutralizing a hydroxide solution, it is possible to deplete the hydroxide in the boundary layer. The layer thickness $\lambda$ contains an areal density of hydroxide ions of $\rho_{OH^-}\lambda$. and the rate of depletion is $2K_L\rho'co^2$. Thus for the fast reaction limit (eqn. x) to apply, $$\frac{\rho_{OH^-}}{2\rho'_{CO_2}}\frac{\tau_R}{\tau_D} \ll 1$$

In our case, $$\rho_{OH^-}\tau_R = \frac{1}{K}$$

Hence the condition can be rewritten as $$2\rho'_{CO_2}\epsilon\tau_D > 1$$

The critical time for transitioning from fast reaction kinetics to instantaneous reaction kinetics is approximately 10 sec for ambient air. The transition does not dependent on the hydroxide concentration in the solution. However, once past the transition, the rate of uptake is limited by the rate at which hydroxide ions can flux to the surface. It is therefore lower than in the fast limit, and the $CO_2$ flux is given by $$F = \frac{1}{2}\sqrt{\frac{D_{OH^-}}{\tau_D}}\frac{\rho_{OH^-}}{2\rho'_{CO_2}}$$

By forcing F into the form in equation x, we find that $$K_L = \sqrt{\frac{D_{OH^-}}{D_L}}\frac{\rho_{OH^-}}{2\rho'_{CO_2}}$$

$$K_L^0 = \sqrt{\frac{D_{OH^-}}{\tau_D}}\frac{\rho_{OH^-}}{2\rho'_{CO_2}}$$

Here $K_L^0$ is the transfer coefficient in the absence of chemical reactions. In the instantaneous regime the flux is independent of the $CO_2$ concentration in the boundary layer.

The flux can be characterized by an effective transfer coefficient, which can be written as $$F = \kappa_{eff}(\rho_{CO_2} - \rho'_{CO_2}/K_H)$$

Here the molar concentrations are for the asymptotic values in the far away gas and far away liquid. In the case of hydroxide solutions, the latter is zero. Hence, $$F = \kappa_{eff}\rho_{CO_2}$$

and $$\kappa_{eff} = \left(\frac{1}{K_G}\right) + \left(\frac{1}{K_L K_H}\right)^{-1}$$

An optimal design is close to the border between gas side limitation and liquid side limitation. Therefore, we establish a design value for the air side boundary thickness $\Lambda$.

$$\Lambda \approx \frac{D_G}{\sqrt{D_L/\tau_R}}$$

This is approximately 4 mm for air based extraction of $CO_2$.

These constraints together very much limit a practical design. For a 1 molar solution, the total flow has been measured as $6\times10^{-5}$ mol $M^{-2}S^{-1}$, which translates into an effective value of 0-4 cm/s which is close to the theoretical value.

All patent applications, published patent applications, issued and granted patents, texts, and literature references cited in this specification are hereby incorporated herein by reference in their entirety to more fully describe the state of the art to which the present invention pertains.

As various changes can be made in the above methods and compositions without departing from the scope and spirit of the invention as described, it is intended that all subject matter contained in the above description, shown in the accompanying drawings, or defined in the appended claims be interpreted as illustrative, and not in a limiting sense.

What is claimed is:

1. A scrubber apparatus for capturing carbon dioxide from open air, comprising: substantially horizontal concentric tubes each including first and second ends and surfaces therebetween and including a center tube axis, wherein said first and second ends are not closed so as to allow a flow of open air to pass through the tubes and directly contact the surfaces;
    A mechanism for continuously rotating each tube around its center tube axis;
    A pump in fluid communication with a source of carbon dioxide solvent;
    A conduit in fluid communication with the pump for introducing the solvent to the surface of the tubes via one of the first and second ends; and
    A catch tray for collecting the solvent flowing from one of the first and second ends.

2. An apparatus according to claim 1, further comprising airflow guides for directing the air flow so that it is substantially parallel to the center axis of the tubes.

3. An apparatus according to claim 2, wherein the airflow guides are configured so as to cause the air to flow substantially horizontally through the tubes.

4. An apparatus according to claim 1, wherein the solvent is adapted to remove carbon dioxide from open air under ambient conditions.

5. An apparatus according to claim 4, wherein the solvent is a hydroxide solution having a hydroxide concentration of from about 0.1 molar to about 20 molar.

6. An apparatus according to claim 1, wherein the conduit and the pump are configured to recycle solvent from the catch tray to one of the first and second ends of the tubes.

7. An apparatus according to claim 1, wherein the surfaces include one or more of grooves, dimples, bumps, and other surface structures that are configured so that air flowing through the tubes remains within the laminar boundary of air flow.

* * * * *